United States Patent [19]
Ward

[11] 4,069,138
[45] Jan. 17, 1978

[54] METHOD AND CATALYST FOR REMOVING MERCAPTANS AND MERCAPTIDE COMPOUNDS FROM AQUEOUS ALKALINE SOLUTIONS AND HYDROCARBON DISTILLATES

[75] Inventor: Clifford Ward, Louisa, Ky.

[73] Assignee: Ashland Oil, Inc., Ashland, Ky.

[21] Appl. No.: 728,041

[22] Filed: Sept. 30, 1976

[51] Int. Cl.$^2$ .................. C10G 27/06; C10G 19/02; C07C 149/00
[52] U.S. Cl. .................................... 208/206; 260/608
[58] Field of Search ................ 208/206, 207; 260/608

[56] References Cited
U.S. PATENT DOCUMENTS

| | | | |
|---|---|---|---|
| 2,853,432 | 9/1958 | Gleim et al. | 260/608 |
| 2,921,020 | 1/1960 | Urban et al. | 208/206 |
| 3,923,645 | 12/1975 | Anderson, Jr. et al. | 208/206 |

*Primary Examiner*—George Crasanakis
*Attorney, Agent, or Firm*—Van D. Harrison, Jr.

[57] ABSTRACT

Disclosed is a catalyst and method for converting mercaptans and mercaptide compounds in aqueous alkaline solution to disulfides. Catalytic agent is metal compound of 3,4-tetrapyridinotetraazaporphine (3,4-TPTAP) preferably impregnated on an inert granular support. Method comprises contacting mercaptans and mercaptide compounds in aqueous alkaline solution with air in the presence of the catalyst and subsequently separating alkaline solution from the resultant disulfide compounds.

10 Claims, 2 Drawing Figures

METHOD AND CATALYST FOR REMOVING MERCAPTANS AND MERCAPTIDE COMPOUNDS FROM AQUEOUS ALKALINE SOLUTIONS AND HYDROCARBON DISTILLATES

NATURE OF INVENTION

This invention relates to a novel method and catalyst for oxidizing to disulfides the mercaptans contained in hydrocarbon distillates and mercaptan compounds present in aqueous caustic solutions used to sweeten hydrocarbon distillates.

PRIOR ART

When hydrocarbon distillates, such as gasoline, naphtha, jet fuel, kerosene, diesel fuel, or fuel oil, contain mercaptans and hydrogen sulfide, they are commonly referred to as "sour" and usually are unsatisfactory for their intended uses. Mercaptans have a highly offensive odor even in minor concentrations. Their presence in gasoline impairs its susceptibility to octane-improvement through adding compounds such as tetraethyl lead. When mercaptans are combusted they yield undesirable atmospheric contaminants in the form of sulfur oxides.

In present day processes hydrogen sulfide is first removed from a sour distillate by contacting it with a selective solvent such as monoethanol amine. Subsequently, the mercaptans are removed by contacting the sour distillate with an aqueous alkaline solution (usually sodium hydroxide) thereby converting the mercaptans to water-soluble mercaptides such as sodium mercaptides. The alkaline solution, when separated from the sweetened distillate, retains the alkali mercaptide compounds and is regenerated for recycling to the sweetening process by converting the mercaptides present to disulfides. The conversion or oxidation of the mercaptides to disulfides is extremely slow. Consequently, a catalyst to increase the rate of conversion to disulfides is used. Ordinarily the disulfides formed are then removed from the alkaline solution by extraction with a suitable solvent such as naphtha. In a variation of the basic process, a mixture of distillate, aqueous alkaline solution, and catalyst is contacted with air thereby converting mercaptans present to the disulfides. Sweetened distillate is recovered from the reaction products. These basic processes are sometimes combined in a two-step mercaptan-removal process.

U.S. Pat. No. 2,966,453 discloses a process for oxidizing mercaptans to disulfides with an oxidizing agent (air) in the presence of a metal porphyrin catalyst or metal azoporphyrin catalyst. Metal porphyrins have a structure as follows where M is a metal and R is a substituent group which may be hydrogen, or an alkyl, aryl or other substituent containing up to 30 or more substituent atoms.

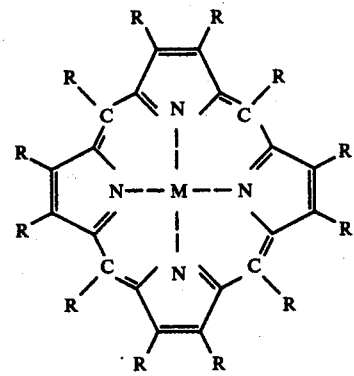

In the 2,966,453 patent, M preferably is cobalt or vanadium, but may be selected from a number of other metals.

Metal azoporphyrins have the following structure where M is a metal.

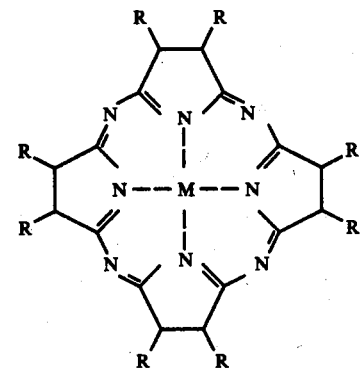

In the 2,966,453 patent, M apparently again preferably is cobalt or vanadium, but may be selected from a number of other metals and R has the relationship stated previously. In the 2,966,453 patent, because the metal porphyrins and azoporphyrins are not readily soluble in neutral or alkaline aqueous solutions, their sulfonated or carboxylated derivative are preferred.

U.S. Pat. Nos. 2,882,224; 2,988,500; 3,108,081; 3,230,180 and 3,148,156, relate to the use of phthalocyanine compounds as a catalyst in the oxidation of mercaptans in alkaline solution. The phthalocyanine compounds have a structural formula as follows where M preferably is cobalt or vanadium.

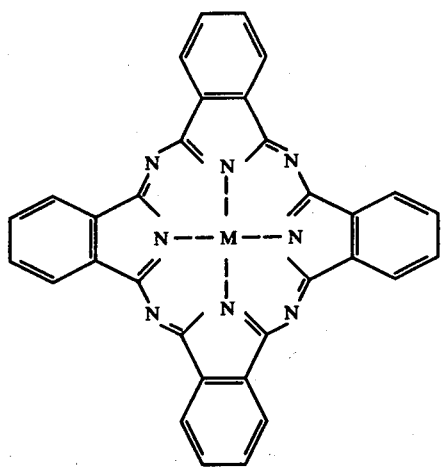

III

Again, the metal phthalocyanine is not readily soluble in aqueous solutions, so the sulfonated or carboxylated derivatives are indicated as preferred in the disclosures of these patents.

U.S. Pat. No. 3,923,645 discloses 2,3-tetrapyridinoporhyrazine-metal-complex catalysts having the structural formula:

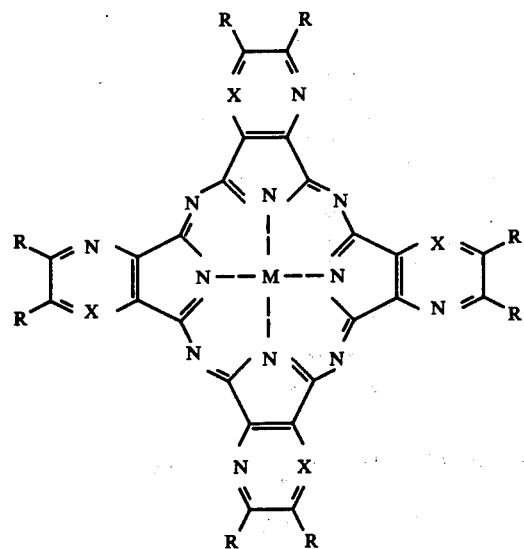

IV where M is a metal selected from the group consisting of iron, manganese, chromium, magnesium, copper nickel, zinc, titanium, hafnium, thorium, tin, lead, columbium, tantalum, antimony, bismuth, molybdenum, palladium, platinum, silver, mercury, vanadium and cobalt. The R group may be hydrogen, or an alkyl or aryl group, or two adjacent R groups may be constitutents of cyclic or aromatic carbon structure. In the same compound, the R groups may be all identical or all different. X is a nitrogen atom or is a carbon atom having one R group attached thereto. Suitable alkyl groups for the R constituent are methyl, ethyl, propyl and iso-butyl. Suitable aryl groups include the phenyl, benzyl and naphthyl groups.

When all the R's are hydrogen, and X is a carbon atom, the preferred compound is defined. This material is made by reacting quinolinic acid and urea in the presence of boric acid and ammonium molybdate with cobaltous chloride to obtain the corresponding metal complex.

SUMMARY OF THE INVENTION

Briefly stated, this invention comprises in one aspect; (a) a method for oxidizing mercaptides to disulfides by contacting said mercaptides with an oxidizing agent (preferably air) in an aqueous alkaline solution (preferably sodium hydroxide) in the presence of a catalyst comprising a metal complex or metal compound of 3,4-tetrapyridinotetraazaporphine, or a substituted derivative thereof, on an inert granular support; (b) in a second aspect, a method for making one form of the metal-complex catalyst, and in another aspect; (c) the catalyst product resulting by depositing the metal complex on an inert carrier, such as granular activated carbon. To avoid confusion, it should be pointed out that the "2,3-tetrapyridinoporphyrazine" compounds of U.S. Pat. No. 3,923,645, if described using the nomenclature of this disclosure, would be characterized as "2,3-tetrapyridinotetraazaporphine" compounds. The distinction between the 2,3- and the 3,4- compounds lies in the location of the nitrogen atom in the outer 6-membered ring.

DETAILED DESCRIPTION OF THE INVENTION

Figure 1:
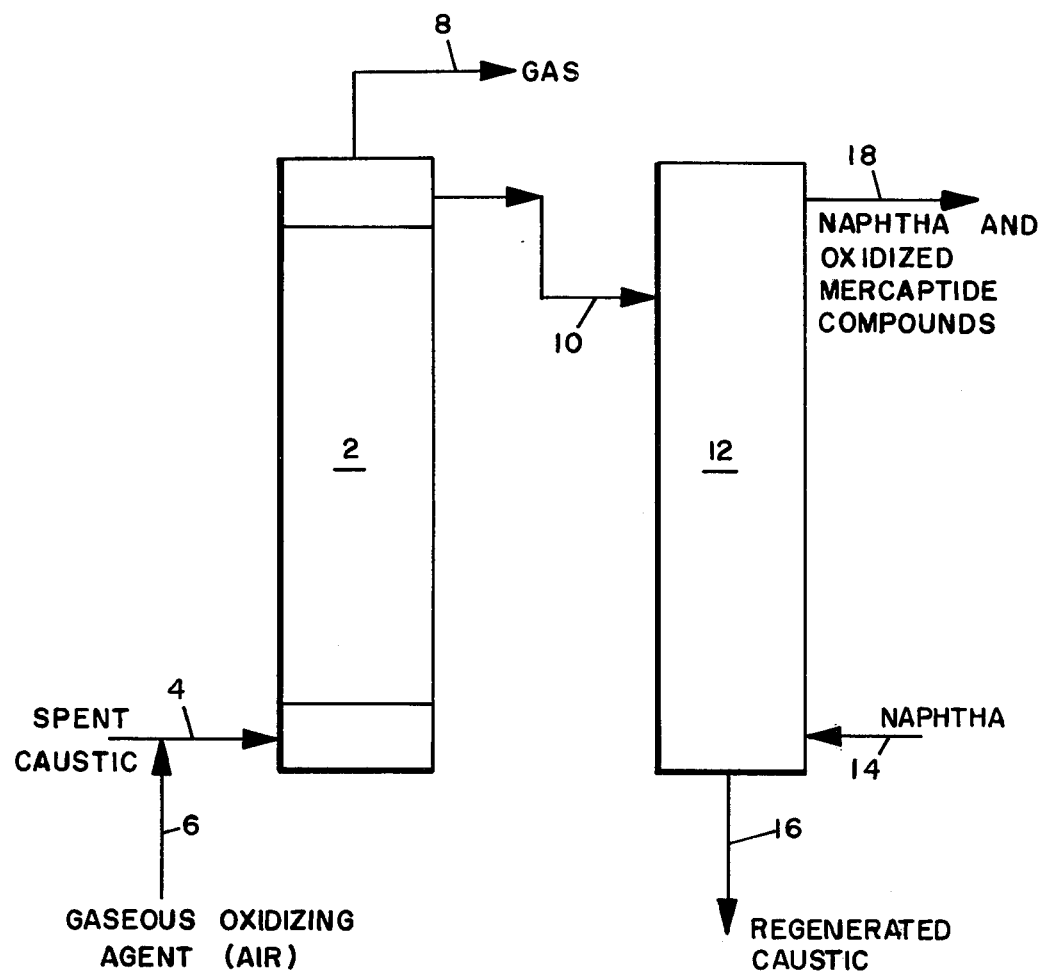
FIG. 1 is a flow sheet depicting one method of this invention wherein an alkaline solution containing alkali mercaptides is contacted with a gaseous oxidizing agent in the presence of a 3,4-tetrapyridinotetraazaporphine metal-complex catalyst.

The following disclosure is divided into three parts to show: (a) a method of making the metal complex of 3,4-tetrapyridinotetraazaporphine, (b) a method of depositing the tetrapyridinotetraazaporphine metal complex on an inert granular carrier and the catalyst resulting hereby; and (c) the method of oxidizing the mercaptans and mercaptides in an alkaline solution to disulfides by contacting them with oxygen in the presence of a metal complex of 3,4-tetrapyridinotetraazaporphine, and substituted derivatives thereof, supported on a porous granular inert carrier.

The metal complexes constituting the basis of our invention are the metal complexes or metal compounds of 3,4-tetrapyridinotetraazaporphine and substituted derivatives thereof and have a structural formula as follows:

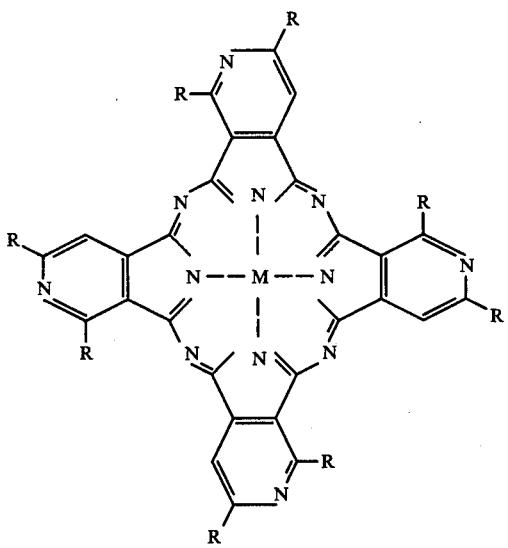

where M is a metal selected from the group consisting of iron, manganese, magnesium, copper, nickel, zinc, titanium, hafnium, thorium, tin, lead, columbium, tantalum, antimony, bismuth, molybdenum, palladium, platinum, silver, mercury, vanadium and cobalt. In the preceding structural formula the R group may be hydrogen, or an alkyl or aryl group, or two adjacent R groups may be constituents of a cyclic or aromatic carbon sturcture. In the same compound the R groups may be all identical or all different. Suitable alkyl groups for the R constituent are methyl, ethyl, propyl and iso-butyl. Suitable aryl groups include the phenyl, and naphthyl groups.

When all the R's are hydrogen, the unsubstituted metal 3,4-tetrapyridinotetraazaporphine compound is defined.

Preferred metal compounds are vanadium and cobalt-tetrapyridinotetraazaporphine wherein the preceding sturctural formula M is vanadium or cobalt and the R groups are all hydrogen. Of these two compounds, the more preferred is cobalt-3,4-tetrapyridinotetraazaporphine which thus has the following structural formula:

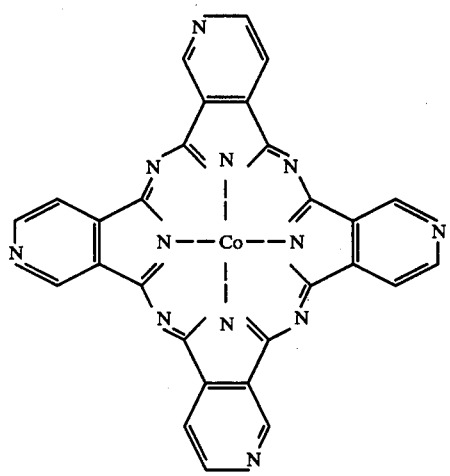

To promote clarity in the remainder of this disclosure the abbreviation "3,4-TPTAP" is used hereinafter to abbreviate the expression "3,4-tetrapyridinotetraazaporphine". The preceding structural formula thus also describes cobalt-3,4-TPTAP which is the preferred metal compound over vanadium 3,4-TPTAP.

PREPARATION OF METAL 3,4-TPTAP COMPOUNDS

The primary reactants utilized in preparing the metal complex of 3,4-tetrapyridinotetraazaporphine are cinchomeronic acid (3,4-pyridinedicarboxylic acid) having the structure,

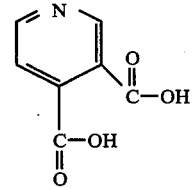

urea, a metal salt, boric acid, and ammonium molybdate, all in the presence of a suitable solvent such as trichlorobenzene. The reactants are reacted preferably in stoichiometric mole proportions as follows:

|                    | Max  | Min   | Preferred |
|--------------------|------|-------|-----------|
| Cinchomeronic acid | 1    | 1     | 1         |
| Urea               | 8.5  | 6.5   | 8.3       |
| Metal Salt         | .35  | .15   | .25       |
| Boric acid         | .35  | .15   | .3        |
| Ammonium Molybdate | .03  | .007  | .01       |

The reactants preferably are mixed in the liquid carrier in a pressurized vessel and the temperature increased to about 240° C. After sufficient time has elapsed to permit reaction, the reaction product is removed and purified. Purification is accomplished by centrifuging or otherwise drying the resulting reaction product, pulverizing it and then washing the product with hot water to remove unreacted urea and other water-soluble impurities, and subsequently with acetone to remove any remaining liquid carrier solvent. The resulting powdered material is the desired product.

Cinchomeronic acid is prepared commercially by the oxidation of isoquinoline. The product is a mixture of cinchomeronic and phthalic acids. This mixture can be used to prepare the TPTAP compound of this invention without adverse effect.

EXAMPLE I

Preparation of Cobalt-3,4-TPTAP Compound

Thirty-five (35) grams of cinchomeronic acid, 105.0 grams of urea, 13.0 grams of cobaltous chloride ($CoCl_2.6H_2O$), 2.8 grams of boric acid, 2.1 grams of ammonium molybdate and 250 milliliters of 1,2,4-trichlorobenzene were combined in a 1 liter-stainless steel reactor. The trichlorobenzene was added to serve as a medium in which to disperse the reactants. The reactor was adapted to vent the reaction gases in excess of 90 psig (7.1 atms.). The reaction mass was heated over a period of approximately one hour to a temperature of 240° C., was then allowed to cool to approximately 100° C., and was then vented to the atmosphere. The supernatant trichlorobenzene was decanted and the solids product removed to another container where it was washed with hot water to remove unreacted urea and any other water soluble salts. The remaining solids were then washed with acetone and dried.

EXAMPLE 2

This example illustrates that mixtures of cinchomeronic acid and phthalic acid can be used. In a procedure similar to Example 1, 17.5 grams of cinchomeronic acid and 15.6 grams of phthalic anhydride were reacted with 105 grams of urea, 13 grams of cobaltous chloride, 2.8 grams of boric acid and 2.1 grams of ammonium molybdate in 250 milliliters of 1,2,4-trichlorobenzene. The reaction was conducted under conditions similar to those of Example 1. A yield of 28.2 grams of product was obtained.

PREPARATION OF SUPPORTED METAL-TPTAP CATALYST

In brief, the method for preparing the supported catalyst comprises: (1) dissolving a metal complex or metal compound of 3,4-tetrapyridinotetraazaporphine (TPTAP) or a substituted derivative thereof having the structural formula shown in preceding Formula V in a suitable solvent; (2) adding the resultant solution to a suitable inert carrier, preferably in granular form; (3) allowing the carrier to soak in the solution at ambient temperature; (4) draining the unadsorbed solution from the carrier; (5) and washing the carrier with an alkaline or neutral solvent, preferably water.

Any inert porous material may be used as a carrier providing it is inert to alkaline solutions, has sufficient porosity and surface area to retain the metal 3,4-TPTAP or derivative thereof in effective amounts, and has sufficient resistance to crushing when placed in a packed column. I prefer a granular activated carbon. As for the solvent used initially to dissolve the complex, any of the mineral acids may be used although I prefer sulfuric acid in a concentration of 50 to 96 percent by weight or more preferably sulfuric acid of 67 to 82 percent concentration. Other suitable solvents are concentrated hydrochloric acid, phosphoric acid, N,N-dimethyl formamide, N-methyl-2-pyrrolidone, and pyridine. It should be noted that the supported catalyst after the final washing need not necessarily be dried but may be put to use in a wet condition.

The amount of metal-3,4-TPTAP or derivative thereof deposited on the porous carrier will vary according to its concentration in the acid solution. It is preferred to deposit as much of the metal compound as possible on the carrier. Use of sulfuric acid of 67 to 82 percent concentration as a solvent for the cobalt-3,4-TPTAP complex results in optimum deposition on granular activated carbon.

A supported catalyst containing between 0.5 and 2 percent by weight of metal compound or metal complex is effective, although even lower concentrations will have beneficial effect in oxidizing mercaptides to disulfides in an aqueous solution.

The following examples are presented to demonstrate the method of preparing the supported catalyst but are not intended to limit the scope of the invention.

EXAMPLE 3

PREPARATION OF COBALT-3,4-TPTAP SUPPORTED CATALYST

One and a half (1.5) grams of the complex prepared in Example 1 was dissolved in 150 milliliters of a 70 percent by weight water solution of $H_2SO_4$. One hundred (100) grams of activated carbon of 8–30 mesh size (U.S. Sieve Series) was added to the solution and the mixture was allowed to set for one hour at room temperature. The mixture was then decanted and filtered to recover the activated carbon. The activated carbon was then further water washed to remove $H_2SO_4$. The activated carbon was determined to be impregnated with the complex in a weight ratio of complex to activated carbon of 1.5 to 100. The catalyst was then ready for testing as a mercaptide oxidation catalyst.

In a similar manner, the complex prepared according to Example 2 was also impregnated on an activated carbon in the same ratio.

OXIDATION OF MERCAPTANS

One embodiment of the invention comprises regenerating an aqueous alkaline solution containing alkali mercaptide compounds by contacting the alkaline solution with an oxidizing agent (preferably gaseous, such as air or other mixtures of oxygen and unreactive gas) in the presence of a catalyst comprising a metal compound, or complex of 3,4-tetrapyridinotetraazaporphine (TPTAP) or substituted derivatives thereof, impregnated on a granular inert solid carrier, preferably activated carbon. The mercaptide compounds present in the aqueous alkaline solution are thereby converted to disulfides. The disulfides are then removed from the aqueous alkaline solution by means well known to refining technology such as by extraction with naphtha. The regenerated caustic is then recycled to the hydrocarbon treating process where it absorbs and reacts with more mercaptans to form alkali mercaptides. After this step the spent caustic is recycled to the regenerating step just described.

In another embodiment the invention comprises mixing a hydrocarbon distillate containing mercaptans directly with aqueous alkaline solution and flowing the mixture together with an oxidizing agent (preferably gaseous, such as air, or other mixtures of oxygen and unreactive gas) through a catalyst bed comprising a metal compound or complex of 3,4-tetrapyridinotetraazaporphine (TPTAP) or substituted derivatives thereof, impregnated on an inert granular solid carrier, preferably activated carbon. The free gas, alkaline solution and distillate are then separated. The oxidized mercaptide compounds (disulfides) by reason of their solubility, remain in the separated distillate.

The metal compound or complex is that corresponding to structural Formula V. The metal compounds preferred are cobalt or vanadium complexes of 3,4-tetrapyridinotetraazaporphine, the cobalt compound being the most preferred. The aqueous alkaline solutions used in the hydrocarbon treating process preferably are solutions of sodium hydroxide (hereinafter referred to as caustic) and of potassium hydroxide. Other alkaline solutions which can be used include those of lithium hydroxide, rubidium hydroxide and cessium hydroxide. However, for economic reasons these last mentioned compounds generally are not preferred.

In the following description of the processes described use, for purposes of illustration, aqueous sodium hydroxide (caustic) and the cobalt or vanadium compounds of 3,4-tetrapyridinotetraazaporphine on granular activated carbon. It is not however, intended to limit the scope of this invention to these compounds since other aqueous alkaline solutions, other granular porous catalyst supports, other metal compounds or complexes of 3,4-tetrapyridinotetraazaporphine can also be used. A number of different types of hydrocarbon streams containing mercaptans can be utilized in that embodiment of the invention wherein the hydrocarbon stream containing mercaptans is mixed with regenerated caustic and flowed with oxidizing gas through a catalyst bed.

Referring now to FIG. 1, reference Numeral 2 designates a fixed bed of catalyst (a catalytic treating zone) containing cobalt 3,4-TPTAP complex impregnated on granular activated carbon. The amount of cobalt 3,4-TPTAP complex on the activated carbon is between about 0.5 and 2.5 percent by weight of the total weight of catalyst. A greater concentration of the complex is, of course, not undesirable and concentrations less than 0.5 will be useful to a lesser degree. Spent aqueous caustic (sodium hydroxide) from a distillate-treating process (for example, a gasoline treating process) flows through line 4 into the bottom of catalyst bed 2. The caustic ordinarily has a concentration of sodium hydroxide of between about 5 and about 25 percent by weight and contains between about 5 and about 5000 ppm of alkali mercaptides depending upon the concentration of mercaptans in the distillate being treated and the contact time between the caustic and sour distillate. A gaseous oxidizing agent, preferably air, (although pure oxygen or oxygen diluted with non-reactive gases can be used) is introduced into line 4 from line 6, where the spent caustic and gaseous oxidizing agent mingle. Other means of mixing the spent caustic and gaseous oxidizing agent may be used prior to or at the time of admitting the two to the bottom of catalyst bed 2. The mixture of spent caustic and gaseous oxidizing agent flows upward through catalyst bed 2. As the caustic solution and mercaptans and mercaptide compounds contained therein progress through the catalyst bed, the mercaptide compounds react in the presence of the cobalt 3,4-TPTAP catalyst with the oxygen present to form the disulfides. At the top of the bed, gas is removed through line 8 and vented from the system. The spent alkaline solution now containing oxidized mercaptide compounds (disulfide) and a minimum of unoxidized mercaptans is carried through line 10 to scrubber 12 where naphtha introduced through line 14 and flowing up through scrubber 12 extracts the disulfides present in the caustic solution. The method of scrubbing alkaline solutions with naphtha to remove oxidized mercaptans is well known to those in the art and needs no further description here. Regenerated alkaline solution is recovered through line 16 and is returned to the distillate treating process.

The liquid-hourly-space velocity (LHSV) of the aqueous alkaline solution flowing through catalytic zone 2 preferably is between about 0.1 and about 20 volumes of aqueous caustic per unit volume of catalyst and the ratio of moles of oxygen admitted to the system to the moles of mercaptan admitted preferably is at least 0.25 to 1, but can be as high as 1 to 1. Operating pressures and temperatures in the regeneration zone 2 are between about 10 and about 100 psig and about 50 and about 150° F. respectively.

Figure 2:
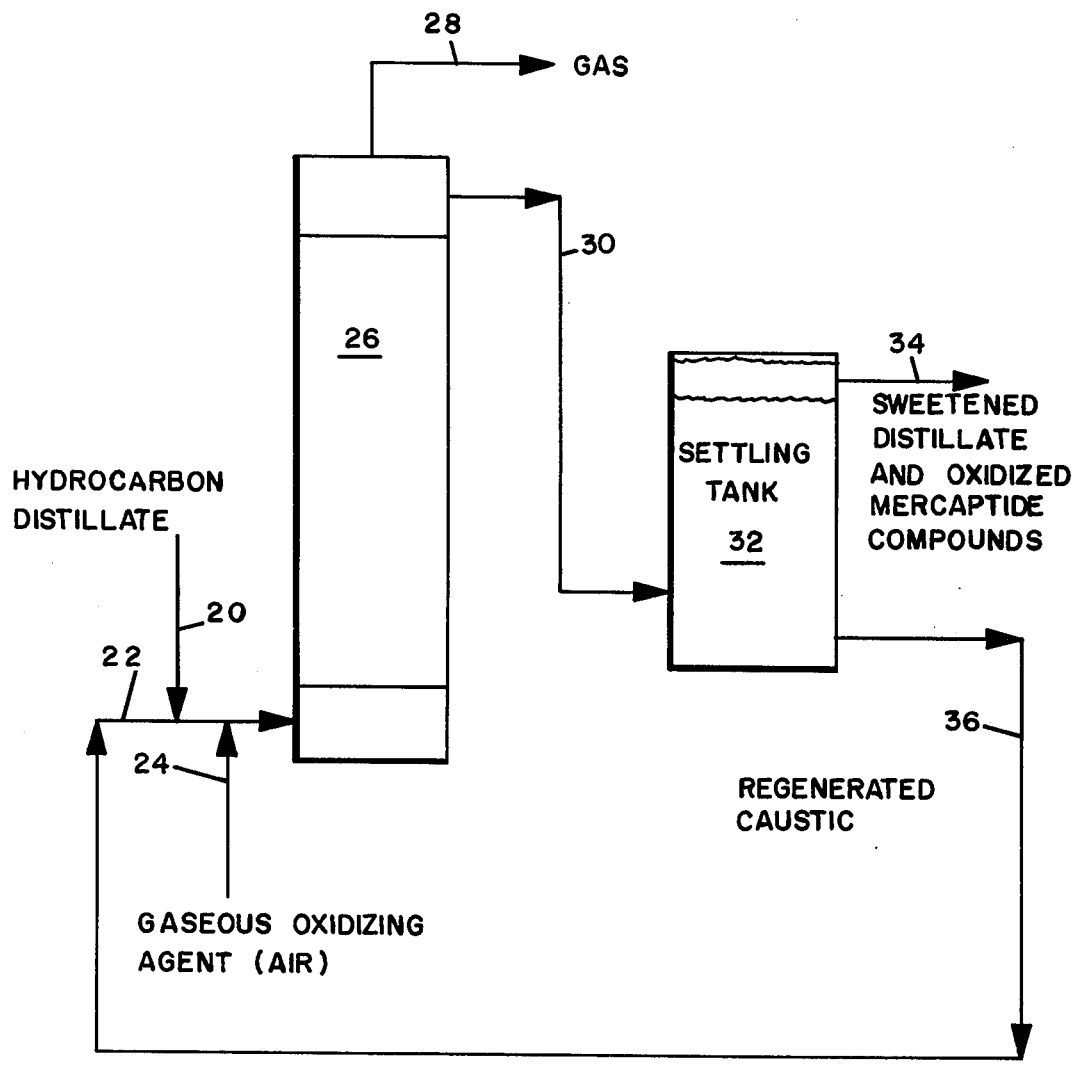
FIG. 2 is a flow sheet depicting another method of this invention wherein the hydrocarbon distillate, a gaseous oxidizing agent, and the alkaline solution simultaneously flow through a fixed bed of the metal-complex catalyst.

FIG. 2 presents schematically a second embodiment of our invention which can be used when the mercaptans present in the hydrocarbon distillate are objectionable primarily because of their odor, and when the mercaptans, if converted to the less offensive disulfide, can remain in the final distillate product. In this embodiment sour hydrocarbon distillate is introduced through line 20 into line 22 wherein regenerated alkaline solution (sodium hydroxide) is flowing. A gaseous oxidizing agent, preferably air, is introduced through line 24 so that a mixture of air, sour distillate, and aqueous alkaline solution are carried through line 22 into the bottom of fixed catalyst bed 26. Catalyst bed 26 contains cobalt 3,4-TPTAP complex impregnated on an inert support, preferably granular activated carbon. The mixture of distillate, alkaline solution and air flows up through catalyst bed 26 to the top where gases present are removed through line 28. As the distillate, alkaline solution and air flow through the catalyst bed, the mercaptan compounds present in the distillate are converted to disulfides which are soluble in the hydrocarbon distillate and are retained therein. The mixture of aqueous alkaline solution and hydrocarbon distillate flows through line 30 into settling tank 32. In settling tank 32 the hydrocarbon distillate now sweetened but still containing the oxidized mercaptan compounds is withdrawn through line 34. The alkaline solution which separates as a separate phase is removed through line 36 and is recycled to the sweetening process. The conditions of temperature, pressure, and LHSV for this embodiment of our invention are the same as for our first embodiment described preceding.

Another method of contacting spent caustic with a gaseous oxidizing agent and the cobalt 3,4-TPTAP complex impregnated on granular activated carbon is a batch process. In this variation the caustic containing mercaptides is mixed with the impregnated carbon and agitated while the gaseous oxidizing agent is bubbled through the mixture. The mixture is then filtered or decanted to remove the activated carbon and the caustic filtrate is stripped of the oxidized mercaptides by conventional methods such as liquid-liquid extraction with naphtha. The regenerated caustic is then ready for recycling to the sweetening process. This method is, however, less desirable because of the difficulties associated with batch processes in comparison to continuous processes.

The following examples are presented to demonstrate our method of regenerating spent aqueous solutions containing alkali mercaptide compounds, but are presented for purposes of illustration only and are not intended to limit the scope of the invention.

EXAMPLE 4

Approximately 10 grams of oxidation catalyst prepared according to Examples 1 and 2 were agitated with 250 millileters of 1 N sodium hydroxide containing 2300 ppm of n-butylthiol while air was bubbled through the reaction mass. At the end of a 30-minute period the concentration of mercaptide in the caustic was 174 ppm.

We claim:

1. A method for oxidizing mercaptans occurring in petroleum hydrocarbon distillates and alkali mercaptide compounds occurring in aqueous alkaline solutions, said compounds resulting from contacting aqueous alkaline solution with said distillates containing mercaptans to their corresponding disulfide compounds comprising contacting said mercaptans and mercaptide compounds in an aqueous alkaline solution with a gaseous oxidizing agent and with a catalyst comprising a metal complex of 3,4-tetrapyridinotetraazaporphine supported on a solid granular inert carrier and having the structural formula:

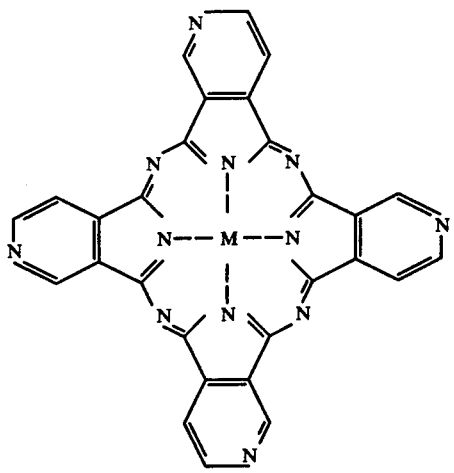

where M is a metal selected from the group consisting of iron, manganese, chromium, magnesium, copper, nickel, zinc, titanium, hafnium, thorium, tin, lead, columbium, tantalum, antimony, bismuth molybdenum, palladium, platinum, silver, mercury, vanadium and cobalt.

2. The method of claim 1 wherein said metal M is cobalt.

3. The method of claim 1 wherein said metal M is vanadium.

4. The method of claim 1 wherein the concentration of metal complex of 3,4-tetrapyridinotetraazaporphine is at least 0.5% by weight of said catalyst.

5. The method of claim 1 wherein said contacting is conducted at a pressure of between about 10 and about 100 psig, a temperature of between about 50 and about 150° F., a liquid-hourly-space velocity of between 0.1 and about 20 volumes of aqueous alkaline solution per volume of catalyst per hour and a ratio of between about 0.25 and about 1 mole of oxygen in said oxidizing gas per mole of mercaptan and alkali mercaptide compounds.

6. The method of claim 1 and the additional step of separating oxidized mercaptide compounds from said aqueous alkaline solution.

7. The method of claim 1 wherein said gaseous oxidizing agent is air.

8. A method for oxidizing mercaptans occurring in an aqueous solution of sodium hydroxide and alkali mercaptide compounds resulting from contacting an aqueous solution of sodium hydroxide with petroleum hydrocarbon distillates containing mercaptans comprising contacting said aqueous solution of sodium hydroxide with air in a ratio of at least 0.25 moles of oxygen in said air per mole of mercaptide and mercaptan, at a pressure of between about 10 psig and about 100 psig, a temperature of between about 50° and about 150° F., a liquid-space-velocity of between about 0.1 and about 20 volumes of said aqueous solution per volume of catalyst per hour, and with a catalyst comprising the metal compound of 3,4-tetrapyridinotetraazaporphine impregnated on granular activated carbon in an amount of at least 0.5 percent by weight of the catalyst and having the structural formula:

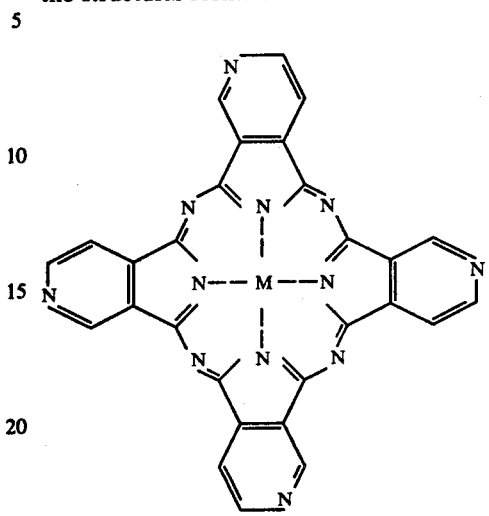

where M is a metal selected from the group consisting of cobalt and vanadium.

9. The method of claim 8 wherein said catalyst contains both cobalt and vanadium compounds of 3,4-tetrapyridinotetraazaporphine impregnated on granular activated carbon.

10. A method for oxidizing mercaptans present in a liquid petroleum hydrocarbon distillate comprising contacting said liquid hydrocarbon distillate with an oxidizing gas in an alkaline solution and with a catalyst comprising a metal compound of 3,4-tetrapyridinotetraazaporphine impregnated on a granular inert carrier and having the structural for

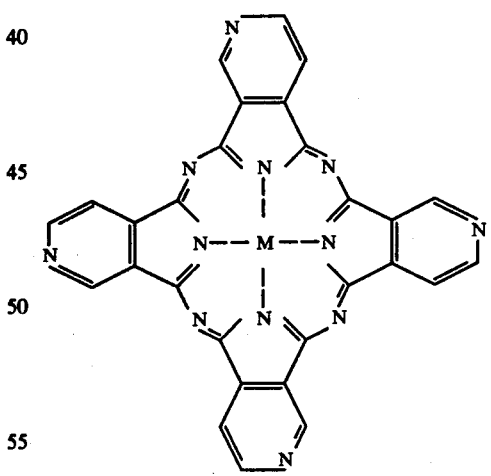

where M is a metal selected from the group consisting of cobalt and vanadium.

* * * * *